June 12, 1951
E. W. DAVIS
2,556,680
VALVE MECHANISM FOR RECIPROCATORY
FLUID PRESSURE OPERATED MOTORS
Filed April 8, 1948
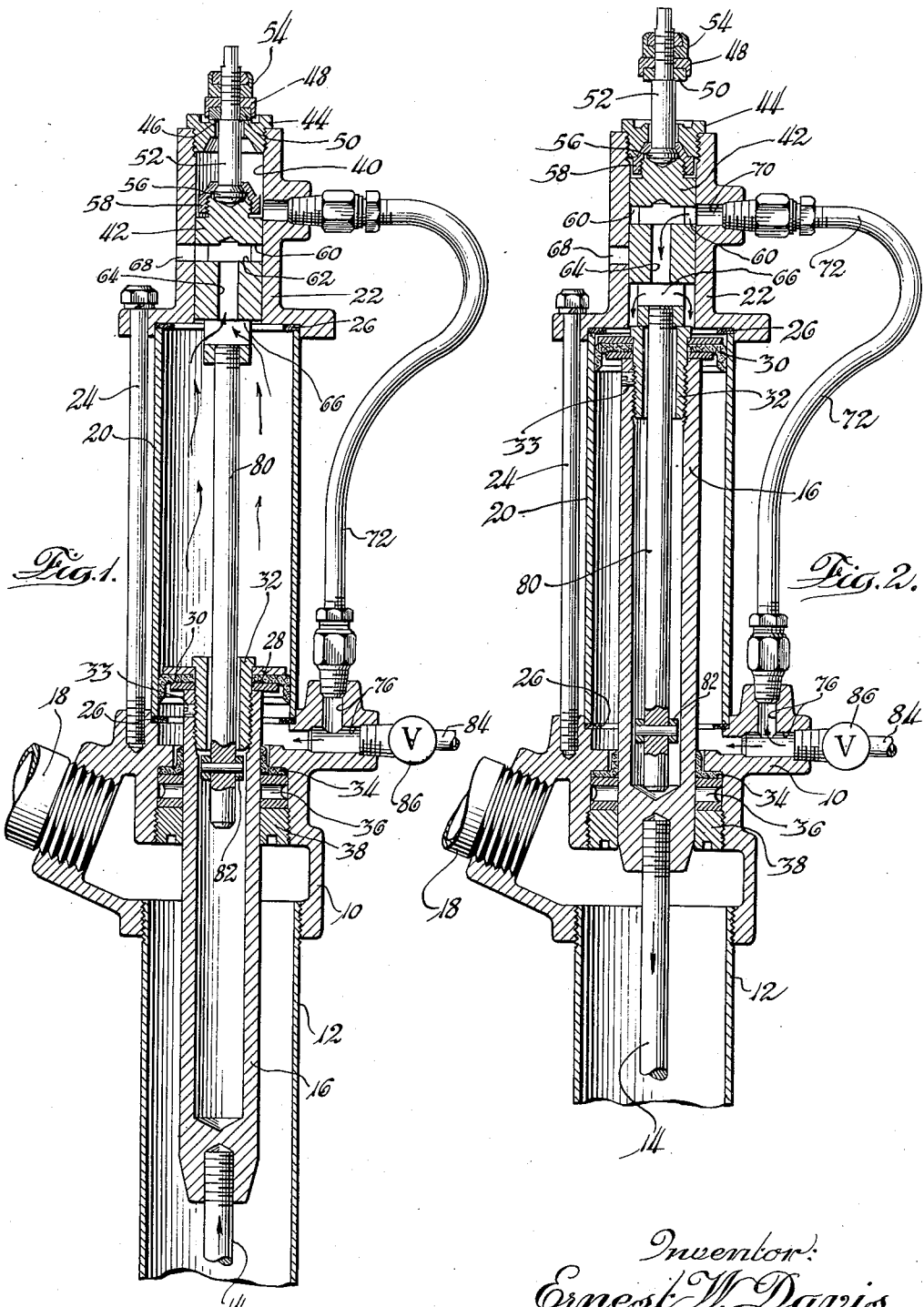
Inventor:
Ernest W. Davis
By Hinkle, Horton, Ahlberg, Hausmann & Wupper
Attorneys.

UNITED STATES PATENT OFFICE 2,556,680

VALVE MECHANISM FOR RECIPROCATORY FLUID PRESSURE OPERATED MOTORS

Ernest W. Davis, River Forest, Ill.

Application April 8, 1948, Serial No. 19,724

5 Claims. (Cl. 121—152)

My invention relates generally to fluid pressure operated motors and more particularly to an improved valve mechanism for reciprocatory motors of this character.

In pneumatically and hydraulically operated reciprocatory motors it has been common practice to provide a valve mechanism for alternately admitting and discharging the pressure fluid to the opposite ends of the piston cylinder. In such mechanisms it has been common to cause shifting of the valve between its alternate extreme positions by means of a lost motion connection with the piston, utilizing some kind of spring device to cause the valve to snap to its extreme positions as the piston approaches the end of its stroke, such spring mechanism having been necessary to insure that the valve would not come to rest in a "dead center" position.

In the valve mechanism of the present invention such spring means are not required since the pressure of the operating fluid, such as compressed air, is utilized to cause the valve to complete its stroke after such stroke has been initiated.

It is therefore one of the primary objects of the invention to provide an improved valve mechanism for reciprocatory fluid pressure operated motors in which reliance is not placed upon springs, which will not stop in dead center position and will not flutter, and which is thus very efficient and dependable in operation.

A further object is to provide an improved valve structure for fluid operated motors of the above described type, which is simple in construction and operation, and may be economically manufactured.

Other objects will appear from the following description, reference being had to the accompanying drawings, in which:

Fig. 1 is a central vertical sectional view of the improved air motor and its valve mechanism, showing the parts in the positions assumed shortly following the commencement of an upward stroke of the motor piston; and Fig. 2 is a view similar to Fig. 1, showing the positions assumed by the parts at the commencement of a downward stroke of the motor piston.

The motor is herein illustrated as designed for the reciprocation of a lubricant pump and comprising a body casting 10 to which a pump cylinder 12 is secured. The lubricant pumping mechanism is operated by means of a piston rod 14 secured to a lower end of the hollow piston stem 16, the lubricant being discharged by this pumping mechanism through a discharge conduit 18.

A motor cylinder 20 is clamped between the body 10 and a valve body 22 by a plurality of tie-bolts 24, suitable gaskets 26 being provided to seal the joints between the ends of the cylinder 20 and the bodies 10 and 22. A piston 28 comprising a cup leather 30 is suitably supported and clamped to the upper end of the piston stem 16 by a bushing 32 threaded in the upper end of the stem 16, and locked in position by a set screw 33. A sliding seal around the hollow piston stem 16 is provided by a hat washer 34 held in place by a gland 36 and packing nut 38.

The valve body 22 is provided with a cylindrical bore 40 in which a valve 42 is reciprocable. The upper end of the bore 40 has an exhaust valve seat bushing 44 threaded therein, this bushing providing a seat 46 for a valve 48. A valve disc 50 of suitable relatively soft material, such as a synthetic rubber compound, forms a face for the valve, and the latter is secured to a stem 52 by a stop nut 54. The lower end of the stem 52 is provided with a head 56 which is clamped to the valve 42 by a nut 58, these parts being formed so that the stem 52 may be aligned with the axis of the valve 42.

The valve 42 has an annular groove 60, a cross drilled passageway 62, an axial passageway 64, and a cross drilled passageway 66. When the valve 42 is in its lowermost position, as shown in Fig. 1, the annular groove 60 is in registry with a vent or exhaust port 68 formed in the valve body 22, whereas when the valve is in its uppermost position, as shown in Fig. 2, the groove 60 is in registry with a power fluid inlet port 70. Compressed air or other operating fluid under pressure is supplied to the port 70 through a conduit 72 which leads to a T-shaped passageway 76 formed in the body 10, one arm of this passageway being suitably connected to a valve 86 for the control of the admission of power fluid to the motor. The third arm of the T-shaped passageway 76 is connected with the lower end of the cylinder 20.

The valve 42 is secured to a valve rod 80 which extends downwardly, freely through the bushing 32 into the hollow stem 16 and has a stop collar 82 pinned thereto.

A suitable operating fluid, such as compressed air, is supplied to the motor through a pipe 84 under the control of a valve 86. Depending upon the particular use of the motor, the valve may be operated manually, electromagnetically, or in any other suitable manner to control the supply of the operating fluid to the motor. Assuming that the parts are in the position shown in Fig. 1 and the valve 86 open to supply air under pressure, the piston 28 will have its lower face subjected to air pressure while the air may escape freely from the upper end of the cylinder through the passageways 66, 64, 62, 60 and 68. The piston will therefore rise until the upper end face of the bushing 32 strikes the lower end of the valve 42, carrying the latter upwardly.

Upon the initial upward movement of the valve 42, the valve 50 is raised from its seat 46 and the upper end of the valve cylinder 40 thus vented to the atmosphere. As soon as the groove 60 starts to register with the inlet port 70 the lower end of the valve 42 is subjected to air under pressure, and the valve will be forced rapidly upwardly by this air pressure until the nut 58, acting as a valve, seats in the complementary conical recess formed in the lower surface of the valve seat bushing 44, as shown in Fig. 2. When this occurs and the annular groove 60 is in registry with the inlet port 70, air under pressure will flow through the passageways 62, 64, 66 into the upper end of the power cylinder 20. Since the air pressure at this time is exerted over the entire area of the top face of the piston 28, the piston will be forced downwardly, it being apparent that the area of the lower surface which is subjected to air pressure, is considerably less than the whole area of the piston which is subjected to the pressure of the air in the upper end of the cylinder 20. The air beneath the piston 28 will therefore be forced through the passageway 70 and conduit 72 into the upper end of the cylinder 20.

Shortly before the piston 28 reaches the lower end of its stroke, the lower end face of the bushing 32 strikes the stop collar 82 and pulls the valve 42 downwardly with it. It will be clear that even after the groove 60 is no longer in registry with the inlet port 70, there will be a considerable volume of air under pressure in the cylinder 20 above the piston 28, and the expansion of this volume of air will be sufficient to cause completion of the downward stroke of the piston 28 and the return of the valve 42 to the position in which it is shown in Fig. 1.

The valve 42 will be held in the position shown in Fig. 1 by virtue of the fact that the upper end of the valve cylinder 40 is subjected to air under pressure supplied through the inlet port 70, while the lower end of the valve is at atmospheric pressure.

It will be noted that the relative positions of the ports 68 and 70 are such that the groove 60, as the valve 42 shifts from one extreme position to the other, is in registry with one or the other of these ports, except during an extremely minor portion of its stroke. During its upstroke, the valve is positively forced by the upward movement of the piston 28 through this short portion of its stroke when the groove 60 is not in registry with either of the ports 68 or 70, whereas during the downstroke, the expansion of the air compressed in the power cylinder 20 above the piston 28 is sufficient to assure completion of the downstroke of the piston 28 and the valve 42. The motor is therefore not subject to stoppage at dead center position despite the fact that there are no springs or detents to force the completion of the valve stroke, as is customarily found in motors of this type.

In the following claims, the words "upper" and "lower" are used solely in their relative sense, since the operation of the valve mechanism is not materially affected by the force of gravity and will operate satisfactorily in any position.

While I have shown and described a preferred embodiment of my invention, it will be apparent that numerous variations and modifications thereof may be made without departing from the underlying principles of the invention. I therefore desire, by the following claims, to include within the scope of the invention, all such variations and modifications by which substantially the results of my invention may be obtained through the use of substantially the same or equivalent means.

I claim:

1. In a compressed air operated reciprocatory motor having a cylinder and piston; a hollow piston rod connected to the piston and extending from the cylinder; a valve body at the head end of the cylinder and having a cylindrical bore, a vent port, an exhaust port, and an inlet port; a two position valve having a passageway communicating continuously with the head end of the cylinder and alternately with the inlet port and the vent port; a disc valve connected to the two-position valve and closing the exhaust port when said passageway of the two-position valve is in communication with the vent port and opening as the two-position valve moves away from such position; a lost motion connection between the piston and two-position valve; and connections for supplying air under pressure to the inlet port and to the rod end of the cylinder.

2. In a reciprocatory pneumatic motor, the combination of a power cylinder, a piston reciprocable in the power cylinder, a relatively large diameter hollow stem secured to the piston and extending through the lower end of the cylinder, means forming a seal for the stem, a valve cylinder at the upper end of the power cylinder and having an inlet port and a vent port, a two-position valve reciprocable in the valve cylinder and having a passageway providing communication between the upper end of the power cylinder and the vent port when the valve is in its lower position and providing communication between the upper end of the cylinder and the inlet port when the valve is in its upper position, said valve also connecting the inlet port to the upper end of the valve cylinder when the valve is in its lower position, an exhaust valve seat at the upper end of the valve cylinder, a disc valve connected to the two-position valve and cooperable with the valve seat when the valve is in its lower position, a lost motion connection between the piston and the two-position valve to shift the latter as the piston approaches the ends of its strokes, and means for supplying air under pressure continuously to the lower end of the power cylinder and to the inlet port of the valve cylinder.

3. In a reciprocatory pneumatic motor, the combination of a power cylinder; a piston reciprocable in the power cylinder; a relatively large diameter rod secured to the piston and extending through the lower end of the cylinder, means forming a seal for the rod; a valve cylinder at the upper end of the power cylinder and having an inlet port and a vent port, a two-position valve reciprocable in the valve cylinder and connecting the upper end of the power cylinder to the vent port when the valve is in its lower position and to the inlet port when the valve is in its upper position, said valve also connecting the inlet port to the upper end of the valve cylinder when the valve is in its lower position; an exhaust valve seat at the upper end of the valve cylinder; a disc valve connected to the two-position valve and seating against the valve seat when the two-position valve is in its lower position; a lost motion connection between the piston and the two-position valve to shift the latter as the piston approaches the ends of its strokes; and means for supplying air under pressure continuously to the lower end of the power cylinder and to the inlet port of the valve cylinder.

4. In a fluid pressure operated reciprocatory motor having a cylinder and piston; a hollow piston rod connected to the piston and extending from the cylinder; a valve body at the head end of the cylinder and having a cylindrical bore, an exhaust port, a vent port, and an inlet port; a two-position reciprocatory valve having a passageway communicating continuously with the head end of the cylinder and alternately with the inlet port and the vent port; a poppet valve connected to the two-position valve and closing the exhaust port when said passageway of the two-position valve is in communication with the vent, and opening as the two-position valve moves away from such position; a headed stem secured to the two-position valve and extending into the hollow piston rod; spaced stops on the piston rod cooperable with the head on the valve stem to move the latter near the ends of the piston strokes; and connections for supplying fluid under pressure to the inlet port and to the rod end of the cylinder.

5. In a reciprocatory pneumatic motor, the combination of a power cylinder; a piston reciprocable in the power cylinder; a relatively large diameter rod secured to the piston and extending through the lower end of the cylinder, means forming a seal for the rod; a valve cylinder at the upper end of the power cylinder and having an inlet port and a vent port, a two-position valve reciprocable in the valve cylinder and connecting the upper end of the power cylinder to the vent port when the valve is in its lower position and to the inlet port when the valve is in its upper position; an exhaust valve seat at the upper end of the valve cylinder; an exhaust valve connected to the two-position valve and seated on the valve seat only when the valve is in its lower position; a lost motion connection between the piston and the two-position valve to shift the latter in the direction of piston movement as the piston approaches the ends of its strokes; and means for supplying air under pressure continuously to the lower end of the power cylinder and supplying it through the inlet port to the upper end of the valve cylinder when the exhaust valve is seated and said two-position valve is in its lower position.

ERNEST W. DAVIS.

REFERENCES CITED

The following references are of record in the file of this patent:

UNITED STATES PATENTS

| Number | Name | Date |
|---|---|---|
| 526,149 | Farley | Sept. 18, 1894 |
| 1,094,811 | Reagan et al. | Apr. 28, 1914 |
| 1,595,939 | Hukill et al. | Aug. 10, 1926 |
| 1,886,309 | Scott | Nov. 1, 1932 |
| 2,060,180 | Davis | Nov. 10, 1936 |